(12) United States Patent
Sonawale et al.

(10) Patent No.: US 10,678,679 B1
(45) Date of Patent: Jun. 9, 2020

(54) SYSTEM, METHOD, AND COMPUTER PROGRAM FOR AUTOMATED APPLICATION PROGRAMMING INTERFACE (API) REGRESSION TESTING

(71) Applicant: Amdocs Development Limited, Limassol (CY)

(72) Inventors: Prashant Vijay Sonawale, Richardson, TX (US); Dror Avrilingi, Modiin (IL); Yasmin Bel Klein, Beit Kama (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 132 days.

(21) Appl. No.: 15/901,772

(22) Filed: Feb. 21, 2018

(51) Int. Cl.
*G06F 11/00* (2006.01)
*G06F 11/36* (2006.01)

(52) U.S. Cl.
CPC ...... *G06F 11/3684* (2013.01); *G06F 11/3664* (2013.01)

(58) Field of Classification Search
CPC .................. G06F 11/3664; G06F 11/3684
See application file for complete search history.

(56) References Cited

U.S. PATENT DOCUMENTS

| | | | |
|---|---|---|---|
| 7,016,800 B1 | 3/2006 | Nguyen | |
| 8,091,072 B2 | 1/2012 | Shah et al. | |
| 9,021,443 B1 | 4/2015 | Lachwani et al. | |
| 2005/0193266 A1* | 9/2005 | Subramanian | G06F 11/3664 714/6.1 |
| 2007/0061780 A1 | 3/2007 | Pokluda et al. | |
| 2008/0184206 A1* | 7/2008 | Vikutan | G06F 11/3688 717/127 |
| 2012/0324432 A1* | 12/2012 | Mizrachi | G06F 11/3624 717/162 |

(Continued)

FOREIGN PATENT DOCUMENTS

GB 2450859 A 1/2009

OTHER PUBLICATIONS

GitHub, "An Automatic Automated Test Writer," Github.com, 2018, pp. 1-5, as retreived from https://github.com/Nedomas/zapata.

(Continued)

*Primary Examiner* — Joshua P Lottich
(74) *Attorney, Agent, or Firm* — Zilka-Kotab, P.C.

(57) ABSTRACT

A system, method, and computer program product are provided for automated API regression testing with a business flow sense/customer journey. In operation, a system identifies one or more environments for which to perform one or more testing activities. The system discovers an application programming interface (API) architecture associated with the one or more environments by tracing all unique combinations of business flows and/or customer journeys on production and discovering all API paths for each of the business flows. The system stores and categorizes information associated with the API architecture in at least one API dictionary, based on the machine learning. The system automatically recommends relevant API test cases associated with the API architecture for performing API testing on the one or more environments, using the information associated with the API architecture from the API dictionary as a reference.

20 Claims, 5 Drawing Sheets

(56) References Cited

U.S. PATENT DOCUMENTS

2016/0283364 A1* 9/2016 Raghavan ............ G06F 11/3692
2019/0114417 A1* 4/2019 Subbarayan ............ H04L 41/16

OTHER PUBLICATIONS

FullStory, "Search your customer experience like you search the web," Fullstory.com, 2017, pp. 1-5, as retrieved from https://www.fullstory.com/features/.

CA Techonologies, "Tired of Depending on Others for API Testing? Service Virtualization to the Rescue," CA.com, 2018, pp. 1-7, as retrieved from https://www.ca.com/us/products/excuse-free-testing/restful-api-test.html.

* cited by examiner

SYSTEM, METHOD, AND COMPUTER PROGRAM FOR AUTOMATED APPLICATION PROGRAMMING INTERFACE (API) REGRESSION TESTING

FIELD OF THE INVENTION

The present invention relates to software and system testing, and more particularly to a system for performing automated application programming interface (API) regression testing utilizing a business flow sense/customer journey.

BACKGROUND

Many technical areas are moving towards DevOps and microservices. APIs are critical aspects of these technologies. However, currently there is no interface/API level tracking and machine learning is available in regression testing of applications/systems.

Additionally, current regression testing systems fail to include a testing framework that handles continuous integration in the DevOps/microservice world. Traditional regression testing systems employ targeted regression execution at the end of a release, which often causes last minute chaos.

Identifying optimum regression testing coverage and prioritizing testing activities was and still is a challenge in the industry, considering the time factor for certification test for production. Testing maximum possible scenarios is impractical and adds more time for testing, which is not a valid option nowadays when industries are implementing new methodologies (DevOps, agile) and given the demand for faster time to market along with reliability. There is a need to test smarter, by understanding what business is being validated, coverage from existing functional behavior and prioritizing the scope and regression testing activities. There is a need to know how production functionality works, analyze from the business flow sense/customer journey and based on that, optimize the regression testing scope.

There is thus a need for addressing these and/or other issues associated with the prior art.

SUMMARY

A system, method, and computer program product are provided for automated API regression testing with a business flow sense/customer journey. In operation, a system identifies one or more environments for which to perform one or more testing activities. The system discovers an application programming interface (API) architecture associated with the one or more environments by tracing all unique combinations of business flows and/or customer journeys on production and discovering all API paths for each of the business flows. The system stores and categorizes information associated with the API architecture in at least one API dictionary, based on the machine learning. The system automatically recommends relevant API test cases associated with the API architecture for performing API testing on the one or more environments, using the information associated with the API architecture from the API dictionary as a reference.

DETAILED DESCRIPTION

Figure 1:
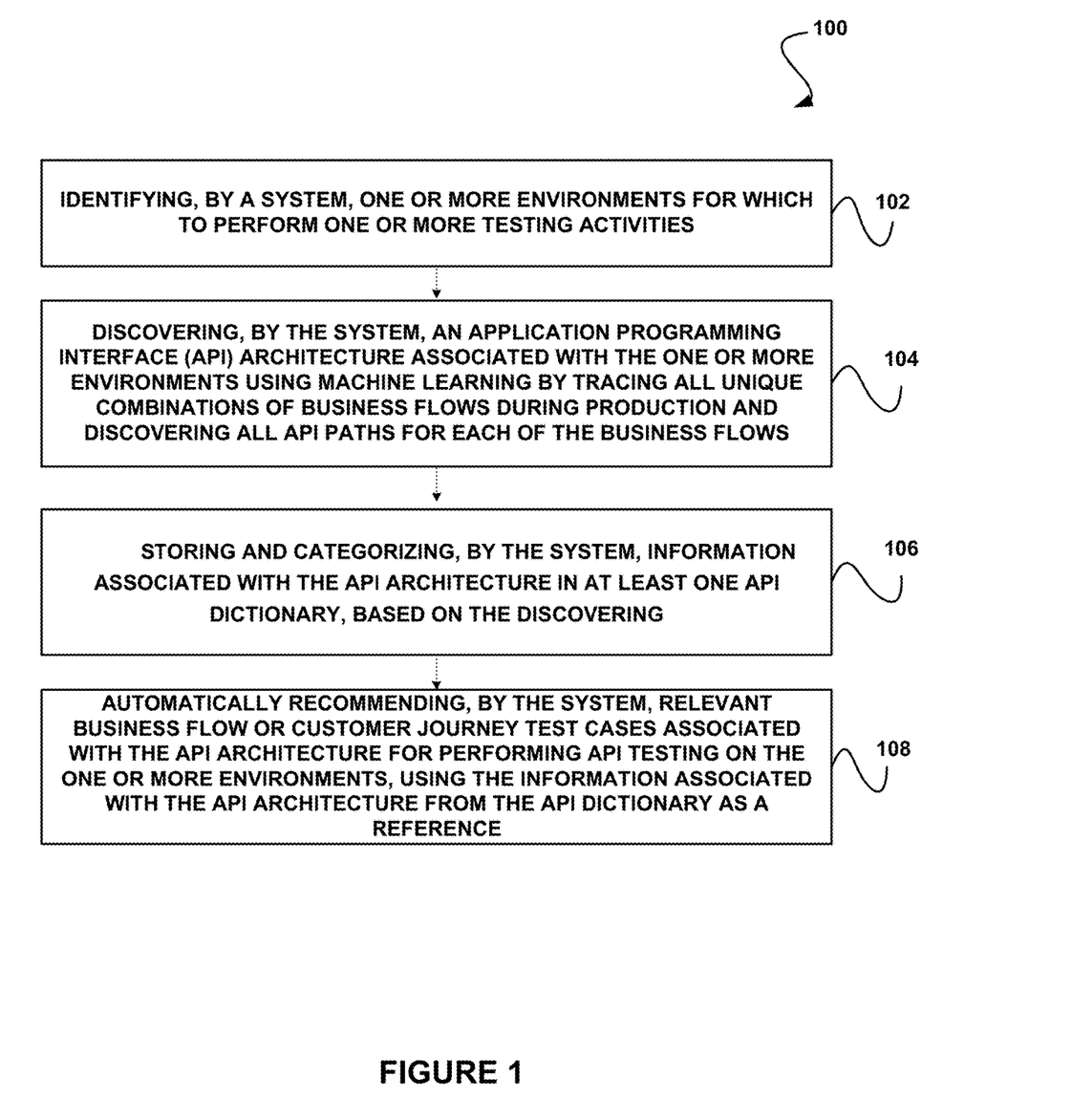
FIG. 1 illustrates a method for automated API regression testing with a business flow sense/customer journey, in accordance with one embodiment.

FIG. 1 illustrates a method 100 for automated API regression testing with a business flow sense/customer journey, in accordance with one embodiment.

In operation, a system identifies one or more environments for which to perform one or more testing activities. See operation 102. The environments may be associated with any industry. For example, in one embodiment, the environments may be associated with the telecommunication industry. Additionally, the environments may include various software, applications, and systems. The testing activities may be associated with any type of testing, such as regression, validation, and/or various other types of testing. In one embodiment, the system may receive input (e.g. a file name, etc.) such that the system is able to identify the environments (e.g. from a user interface, etc.). In another embodiment, there may be agents or other tools that will be listening to production either by siting on the application or sniffing.

The system discovers an application programming interface (API) architecture associated with the one or more environments using machine learning by tracing all unique combinations of business flows on production and discovering all API paths for each of the business flows. See operation 104. For example, discovering the API architecture may include discovering all relevant APIs aggregated to business transactions including parameters within the APIs.

The system will have several modes of discovery—from discovering all running business process to categorizing the scope of discovery. The system will enable the user/automated process to select parameters that as per these parameters the discovery process will run.

The system stores and categorizes information associated with the API architecture in at least one API dictionary, based on the machine learning. See operation 106. For example, storing and categorizing the information may include storing and categorizing configuration XML/JSON tags associated with APIs that need validation. The categorization is one aspect—using machine learning that will analyze the path and decide the category. Next level is to analyze the API related data and store all available parameters for specific API/Interface.

The system automatically recommends relevant API business flows test cases with combinations of different set of API information with business flow sense/customer journey associated with the API architecture for performing regression testing on the one or more environments, using the information associated with the API architecture from the API dictionary as a reference. See operation 108. The system will be able to produce regression a testing suite which contains business process testing/customer journey testing. Automatically recommending the relevant API test cases may include utilizing business process flow information from the API dictionary as a reference. The system may function to continuously discover new APIs added to the one or more environments and automatically provide suggestions for testing validation values. Further the system may generate a graphical representation of the API architecture including the business flows.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

Further in one embodiment, the system may be utilized to discover applications and/or products for a specific customer journey and/or APIs. For example, the system may discover one or more applications and/or products associated with the one or more environments by tracing all unique combinations of business flows and/or customer journeys on production and discovering all applications and/or products for each of the business flows. The system may then store and categorize information associated with the one or more applications and/or products in at least one dictionary, based on machine learning. The system may automatically recommend relevant test cases for performing testing on the one or more environments, using the information associated with the one or more applications and/or products as a reference.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
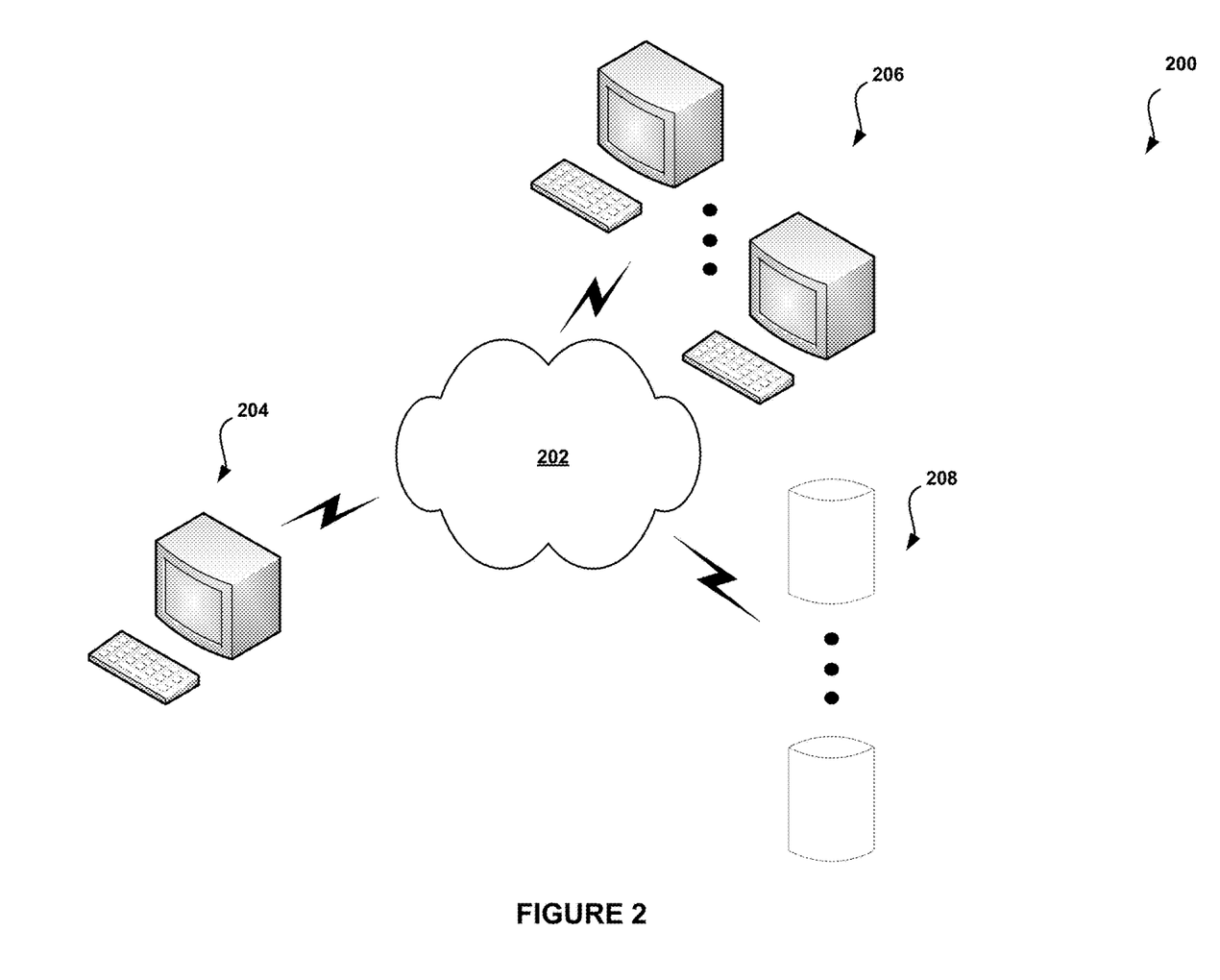
FIG. 2 shows a system for automated API regression testing with a business flow sense/customer journey, in accordance with one embodiment.

FIG. 2 shows a system 200 for automated API regression testing with a business flow sense/customer journey, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an API Automated system 204, which may implement a variety of applications or software, etc. The system 204 may be capable of communicating with a plurality of systems 206, either directly or over one or more networks 202, for performing automated API regression testing. The system 204 may also be in communication with one or more repositories/databases 208, which may include one or more API dictionaries/repositories.

Many technical areas are rapidly moving towards DevOps and microservices. APIs are a critical aspect of these technologies. The system 204 functions to perform automated API regression testing, not just by understanding the API structure and trying different combinations, but by understanding APIs with a business flow sense/customer journey by directly listening to production API transactions and adding smart validations. The system 204 can either automatically test a single API with different combinations or use artificial intelligence to automatically recommend API test case permutations using API repository information to validate a particular business flow/customer journey.

The system 204 may use artificial intelligence to gather analytics from the machine learning and shift that information to the left to incorporate the earlier testing phases. The system 204 may be utilized for both monolith and microservice applications for any business enterprise.

In operation, the system 204 creates and executes an API repository for products/systems based on production monitoring associated with business process flows/customer journey. The system 204 will capture all relevant APIs aggregated to business transactions, including the parameters within the APIs. Once this is performed with machine learning capabilities of the system 204, the system 204 will compare this information with information existing in the API repository. The system 204 will recommend all relevant API test case permutations automatically, using business process flows/customer journey as a reference. With built in artificial intelligence, the system 204 will be able to identify the difference comparing production system and repository and only add relevant delta information automatically during machine learning process.

The system 204 provides end to end automated testing API level regression test validation with built-in intelligence to validate APIs' input and output tag values, using business process flows/customer journey as a reference.

The system 204 also provides API level execution tracking for understanding the current level of execution coverage during any stage of a testing phase and also compares data with a production API threshold and aligns a testing strategy per production quantification. The system 204 also provides continuous API level validation during every business flow execution, to provide more confidence at any stage of the testing phase.

In various embodiments, the system 204 may employ machine learning and built in artificial intelligence to provide automated API regression with a business flow sense/customer journey.

Figure 3:
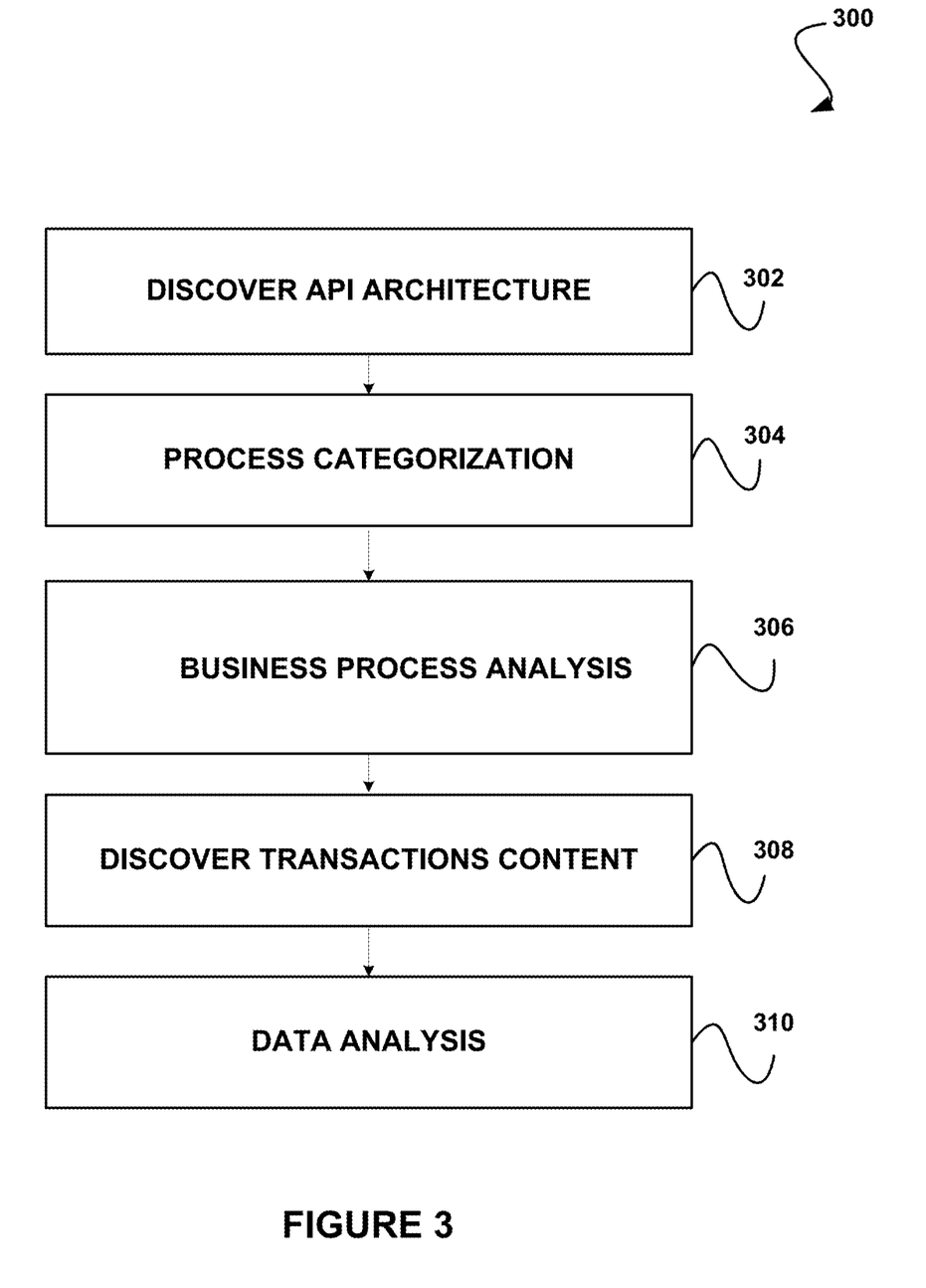
FIG. 3 shows a system flow diagram for automated API regression testing, in accordance with one embodiment.

FIG. 3 shows a system flow diagram 300 for automated API regression testing, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

The diagram 300 shows steps that a system (e.g. the system 204, etc.) may perform for a discovery and exploration (monitoring) phase associated with automated API regression testing.

As shown, the system discovers an API architecture. See operation 302. In this step, the system traces all unique combinations of the business flows on production and discovers all the APIs path for a particular business flow/customer journey. This continuous monitoring of a business path associated with APIs is used by the system for process categorization to create reference dictionary information of the API business flows.

The system produces a set of test cases in several points during the process. These points are configurable and are not limited and can be added. The system will produce test cases based on business process (set of APIs), generate test cases for API testing and can generate test cases of combination of business process and data. As mentioned, more types of test cases can be added in each stage of the process. The system has the capability to generate these test cases.

Next, the system performs process categorization. See operation 304. In this step, the system populates an API dictionary that stores business flow related API details and functions as a reference during an analysis phase. The system may implement an API dictionary that utilizes machine learning and the system may add data to the dictionary while monitoring information associated with production. Further, a comparison may be performed by the system between production and the dictionary. A result of the difference, syncdiff (i.e. a gap between repository dictionary and the production discovered API information), may be used by the system for auto population or to trigger manual action. The system will categorize the type of the business flows based on the dictionary definition. In this phase, the system may also capture details related to API fallouts/recovery processes, which may be used further by the system for smart analysis, regression testing execution and reporting purposes.

Next, the system will perform business process analysis. See operation 306. In this step, after all flows are categorized, the system will start the analysis stage. Based on preconfigured definitions (e.g. concurrency, revenue, etc.), the system will perform analysis and find the common (e.g. 80-20) processes combination that are the most frequent in production or find any set of processes according to a predefined parameters. In one embodiment, a user may configure critical business API flows to start recording API transactions on production for deeper machine learning analysis. This phase may give a user an opportunity to zoom into any business flow information the user wants to analyze deeply due to past experience, such as frequently failing scenarios, business critical functions, etc., which will be suitable candidates for further analysis. Selected business processes from the previous stage will be continuously monitored on production by the system and their API data within the API architecture defined in API dictionary will be retrieved and stored in the API repository by the system. Artificial intelligence will be recommending optimum business flows to be further discovered for machine learning based on the analytics and also there will be an option to discover all business processes discovered for analytics purpose.

Next, the system will discover transaction content. See operation 308. In this step, the system will be able to discover and collect the data of each transaction between all APIs for specific business processes. The system has the API dictionary that will contain all possible tags and values for each API. Based on machine learning, the system will be able to compare the discover data to the existing data in the dictionary and add the discovered information that is missing. In this phase, the system may use smart save intelligence to validate the existing repository and only record delta information required for the machine learning phase.

This is a continuous machine learning phase, where the system may perform smart data analysis of API repository information already received from the discover transaction content phase. The system may use the last saved API structure of a particular business flow and retrieve saved API repository data and start filling API request information using artificial intelligence. When the system has a plurality of tag information, the system may create that many combinations and smartly use API repository information to create automated API test cases for a particular API or an entire business flow. The system may review API information, such as date/customer data, and keep logic aligned to use testing environment specific data during test cases creation and also align data as per the recorded logic to provide state of the art automation intelligence added for optimum use and flexibility to adapt into any testing environment. The API dictionary may store all input and outputs tags for each API.

The system then performs data analysis. See operation 310. After all data was captured, the system will start the analysis stage. Based on preconfigured definition (e.g. concurrency, revenue, etc.), the system will perform analysis and will find the common (e.g. 80-20) data combination that is the most frequent in production per business process. Selected data from the previous stage will be continuously monitored by the system on production.

With respect to execution, the system may utilize a single API associated with multiple permutations to test that particular API. The system will produce test cases for each API to cover all permutations and combinations for a single API as per the data discovered in the API dictionary. Business flow automated API tests may be implemented by the system by creating multiple permutations of APIs related to that particular business flow.

The system may provide a frequently failed APIs list and recommend recovery/fault management scenarios. Additionally, the system may provide input for test cases for API tags validation during the test planning phase/automation script creation phase. Further, the system may provide overall business process view for client/user for testing strategy purposes.

The system and techniques described herein are scalable to any system (of engagement) that uses API systems on any platform supported for any business enterprise, to thrive in the microservices arena, etc.

Figure 4:
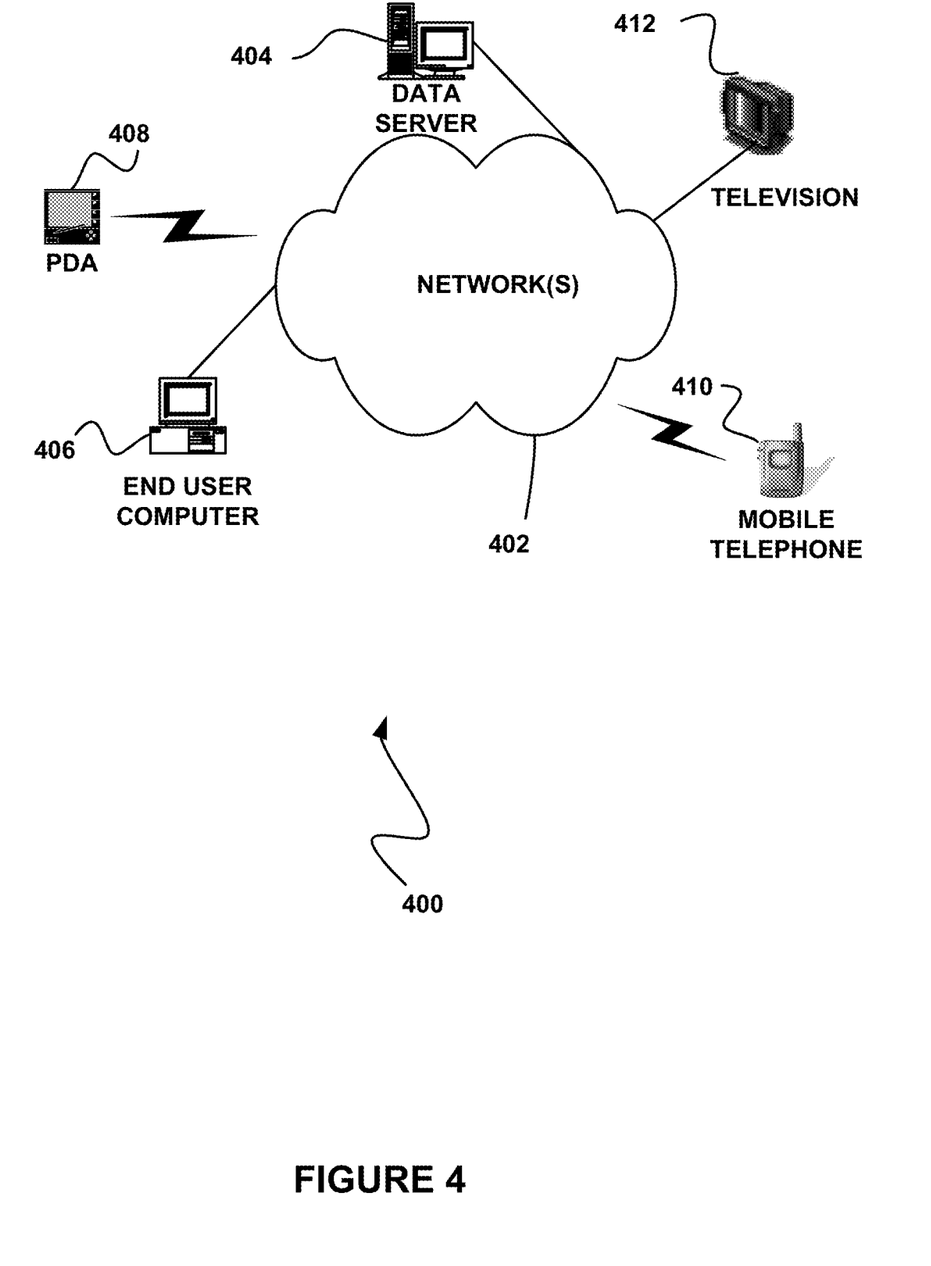
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
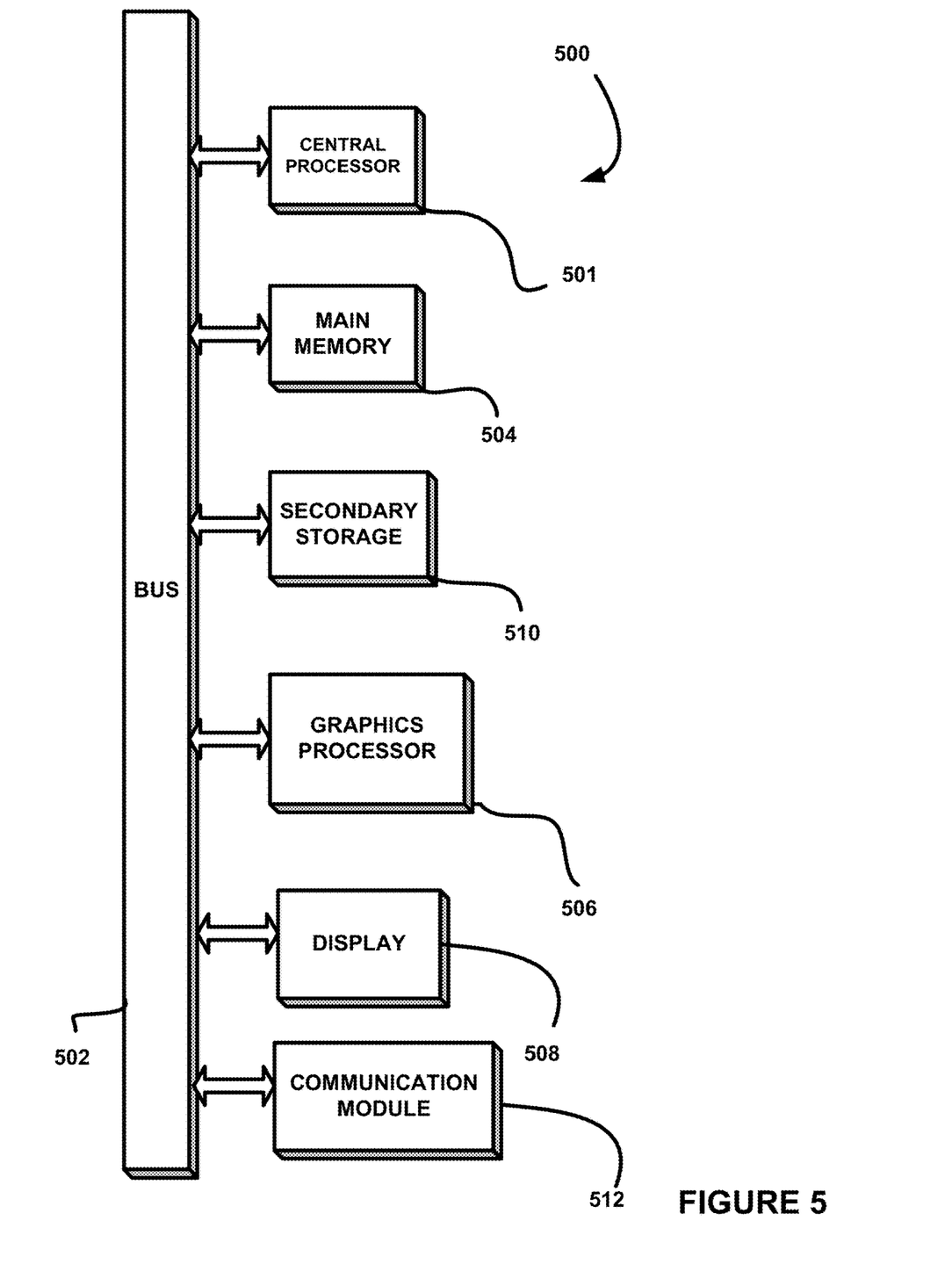
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying, by a system, one or more environments for which to perform one or more testing activities;
discovering, by the system, an application programming interface (API) architecture associated with the one or more environments using machine learning by tracing all unique combinations of business flows during production and discovering all API paths for each of the business flows;
storing and categorizing, by the system, information associated with the API architecture in at least one API dictionary, based on the discovering; and
automatically recommending, by the system, relevant business flow or customer journey test cases associated with the API architecture for performing API testing on the one or more environments, using the information associated with the API architecture from the API dictionary as a reference.

2. The method of claim 1, wherein discovering the API architecture includes discovering all relevant APIs aggregated to business transactions including parameters within the APIs.

3. The method of claim 1, wherein storing and categorizing the information includes storing and categorizing configuration XML or JSON tags associated with APIs that need validation.

4. The method of claim 1, wherein automatically recommending the relevant API test cases includes utilizing business process flow information from the API dictionary as a reference.

5. The method of claim 1, wherein the system generates a graphical representation of the API architecture including the business flows.

6. The method of claim 1, wherein the system functions to continuously discover new APIs added to the one or more environments and automatically provides suggestions for testing validation values.

7. The method of claim 1, wherein the relevant API test cases include regression testing validation values.

8. A non-transitory computer readable medium storing computer code executable by a processor to perform a method comprising:
identifying, by a system, one or more environments for which to perform one or more testing activities;
discovering, by the system, an application programming interface (API) architecture associated with the one or more environments using machine learning by tracing all unique combinations of business flows during production and discovering all API paths for each of the business flows;
storing and categorizing, by the system, information associated with the API architecture in at least one API dictionary, based on the discovering; and
automatically recommending, by the system, relevant business flow or customer journey test cases associated with the API architecture for performing API testing on the one or more environments, using the information associated with the API architecture from the API dictionary as a reference.

9. The non-transitory computer readable medium of claim 8, wherein discovering the API architecture includes discovering all relevant APIs aggregated to business transactions including parameters within the APIs.

10. The non-transitory computer readable medium of claim 8, wherein storing and categorizing the information includes storing and categorizing configuration XML or JSON tags associated with APIs that need validation.

11. The non-transitory computer readable medium of claim 8, wherein automatically recommending the relevant API test cases includes utilizing business process flow information from the API dictionary as a reference.

12. The non-transitory computer readable medium of claim 8, wherein the system generates a graphical representation of the API architecture including the business flows.

13. The non-transitory computer readable medium of claim 8, wherein the system functions to continuously discover new APIs added to the one or more environments and automatically provides suggestions for testing validation values.

14. The non-transitory computer readable medium of claim 8, wherein the relevant API test cases include regression testing validation values.

15. A system, comprising one or more processors, operable for:
identifying, by the system, one or more environments for which to perform one or more testing activities;
discovering, by the system, an application programming interface (API) architecture associated with the one or more environments using machine learning by tracing all unique combinations of business flows during production and discovering all API paths for each of the business flows;
storing and categorizing, by the system, information associated with the API architecture in at least one API dictionary, based on the discovering; and
automatically recommending, by the system, relevant business flow or customer journey test cases associated with the API architecture for performing API testing on the one or more environments, using the information associated with the API architecture from the API dictionary as a reference.

16. The system of claim 15, wherein discovering the API architecture includes discovering all relevant APIs aggregated to business transactions including parameters within the APIs.

17. The system of claim 15, wherein storing and categorizing the information includes storing and categorizing configuration XML or JSON tags associated with APIs that need validation.

18. The system of claim 15, wherein automatically recommending the relevant API test cases includes utilizing business process flow information from the API dictionary as a reference.

19. The system of claim 15, wherein the system generates a graphical representation of the API architecture including the business flows.

20. The system of claim 15, wherein the system functions to continuously discover new APIs added to the one or more environments and automatically provides suggestions for testing validation values.

* * * * *